No. 722,230. PATENTED MAR. 10, 1903.
E. B. HAYES & J. M. KUEBLER.
TENONING MACHINE.
APPLICATION FILED DEC. 23, 1901.

NO MODEL. 9 SHEETS—SHEET 1.

No. 722,230. PATENTED MAR. 10, 1903.
E. B. HAYES & J. M. KUEBLER.
TENONING MACHINE.
APPLICATION FILED DEC. 23, 1901.
NO MODEL. 9 SHEETS—SHEET 2.

No. 722,230. PATENTED MAR. 10, 1903.
E. B. HAYES & J. M. KUEBLER.
TENONING MACHINE.
APPLICATION FILED DEC. 23, 1901.
NO MODEL. 9 SHEETS—SHEET 4.

Witnesses:
Harold F. Barrett
Bert Rieman

Inventors
Eli B. Hayes
John M. Kuebler
By Rector & Hibben
their Attys

No. 722,230. PATENTED MAR. 10, 1903.
E. B. HAYES & J. M. KUEBLER.
TENONING MACHINE.
APPLICATION FILED DEC. 23, 1901.
NO MODEL. 9 SHEETS—SHEET 6.

No. 722,230. PATENTED MAR. 10, 1903.
E. B. HAYES & J. M. KUEBLER.
TENONING MACHINE.
APPLICATION FILED DEC. 23, 1901.
NO MODEL. 9 SHEETS—SHEET 9.

UNITED STATES PATENT OFFICE.

ELI B. HAYES, OF OSHKOSH, AND JOHN M. KUEBLER, OF WAUSAU, WISCONSIN.

TENONING-MACHINE.

SPECIFICATION forming part of Letters Patent No. 722,230, dated March 10, 1903.

Application filed December 23, 1901. Serial No. 86,923. (No model.)

*To all whom it may concern:*

Be it known that we, ELI B. HAYES, residing at Oshkosh, Winnebago county, and JOHN M. KUEBLER, residing at Wausau, Marathon county, Wisconsin, have invented certain new and useful Improvements in Tenoning-Machines, of which the following is a specification.

Our invention relates to tenoning-machines, more particularly the double-end tenoning-machines of the general class and character described in Patent No. 525,812, issued on September 11, 1894, to the above-mentioned E. B. Hayes.

The object of our invention is to provide a tenoning-machine of improved construction and operation, the novel features of which and the advantages thereof will be apparent from the description hereinafter given.

In the drawings, Figure 1 is a plan view of our new tenoning-machine. Fig. 1ª is a perspective of a check-rail sash, to make which our machine is adapted and herein shown adjusted. Fig. 4, a side elevation of the movable pedestal with the lower portion thereof shown in section; Fig. 4ª, a section of the pinions of the feed-screws on each pedestal; Fig. 5, a section on line 5 of Fig. 4; Fig. 6, an elevation of one end of our machine; Fig. 6ª, an elevation of the tenon-cutters and the saw-spurs; Fig. 6ᵇ, a section on line x of Fig. 6ª; Fig. 7, an elevation of the other end of the machine; Fig. 7ª, a perspective of the adjustable gage; Fig. 11, an enlarged elevation of a chain-beam, its chain and the pressure device, said pressure device being partly in section; Fig. 12, a section on the line 12 of Fig. 11; Fig. 13, a section on the line 13 of Fig 11, and Figs. 14 and 15 elevations showing modified forms of construction of the means for adjusting the sliding frames which carry the tenon-cutters.

As in Patent No. 525,812, our present machine has a bed-plate 1, the fixed pedestal 2, and the longitudinally-adjustable pedestal 3, slidable on said bed-plate. The means for moving the pedestal 3 differ from that illustrated in said former patent and comprises the following construction: The main drive-shaft 4 extends longitudinally of the machine, and where it passes through the pedestal 3 a long sleeve 5 is splined thereon and journaled in suitable bearings formed in the walls of the pedestal, all as clearly illustrated in Fig. 4. Preferably forming an integral part of the sleeve and located at one end thereof is a friction wheel or pulley 8, revolving continuously with the drive-shaft. To hold the sleeve with respect to its bearings and pedestal, a collar 7 abuts the left-hand bearing, Fig. 4, while the friction-wheel 8 is limited as against left-hand independent movement by the right-hand bearing.

A bearing bracket or box 9 is bolted to the lower end of the pedestal 3 to receive the hub 10 of the gear-wheel 11. The hub is internally screw-threaded for a portion of its length to engage the stationary screw-shaft 12, whose free end is supported in the lug or bearing 13 on the bed-plate. To keep the gear and hub in place with respect to the bearing-bracket, a collar 14 is secured to the free end of such hub by a set-screw 15 or otherwise.

Figures 1, 1A:
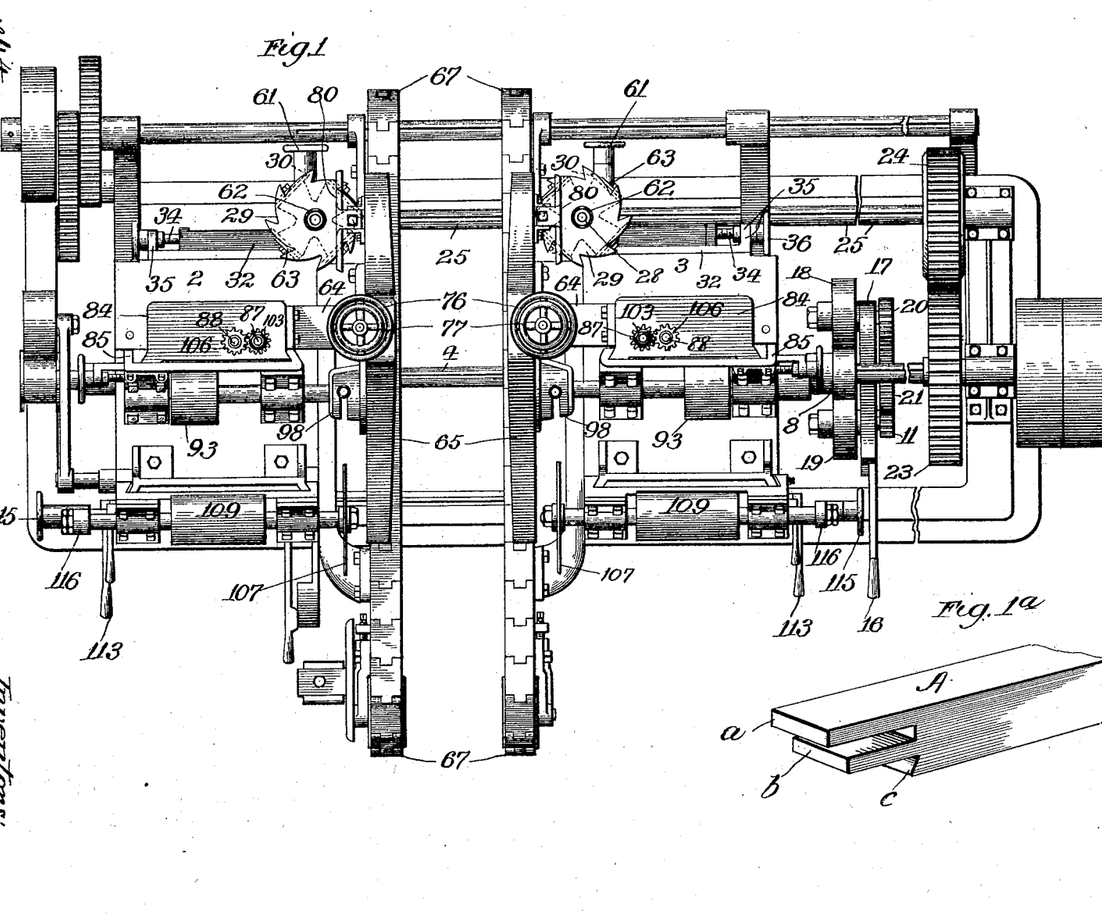
Figures 4, 4A, 5:
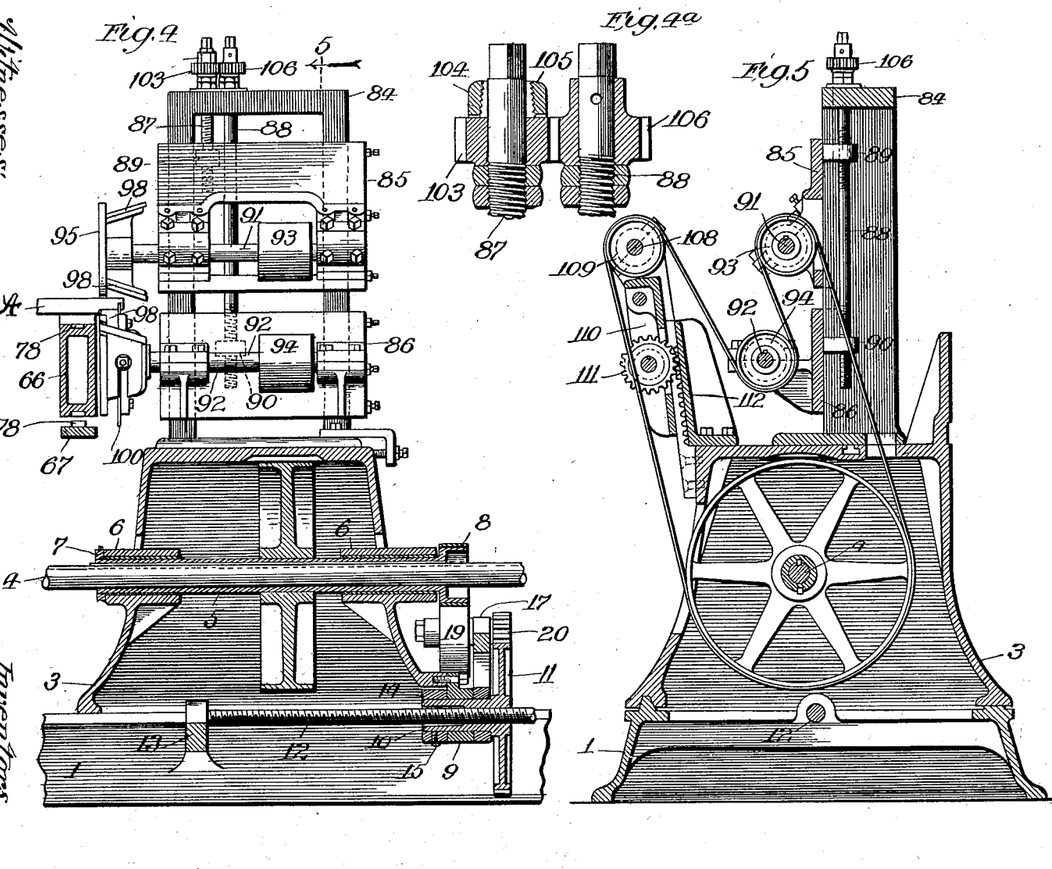
Figures 6, 6A, 6B:
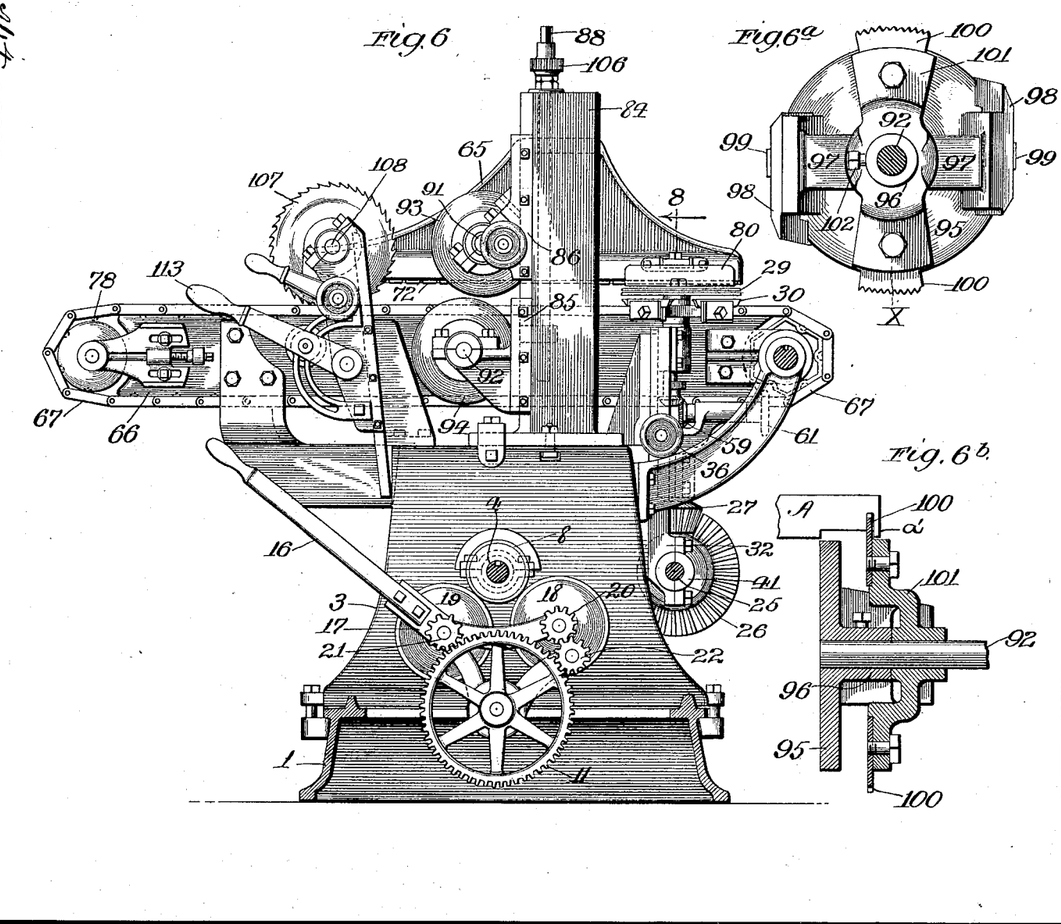
Figures 7, 7A:
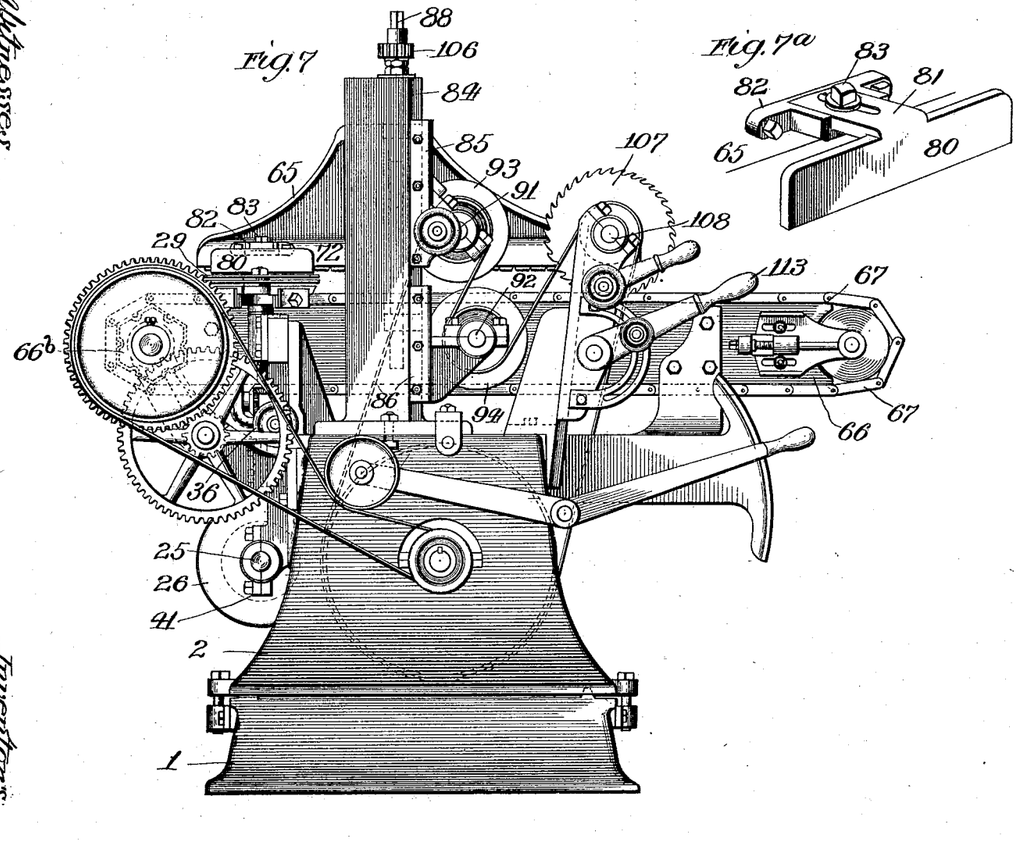

To operate the gear 11 in either direction, so as to adjust the pedestal 3 to the right or left, the following provision is made, reference being had to Figs. 1, 4, and 6: A hand-lever 16 is connected to a substantially triangular frame 17, pivoted loosely at its lower end on the hub 10 of the gear 11. This pivoted frame carries the two friction-wheels 18 and 19, adapted to be alternately put into frictional contact with the continually-revolving friction-wheel 8, accordingly as the hand-lever is raised or lowered. This pair of friction-wheels is provided with the pinions 20 and 21, the latter meshing directly with the gear 11 and the former with an intermediate pinion 22, also journaled in the pivoted frame 17, with the result that the movement of either friction-wheel 18 19 is communicated to the drive-gear 11, which by reason of its movement upon the stationary screw 12 causes a longitudinal movement or adjustment of the movable pedestal on the bed-plate. The normal position of the hand-lever 16 is as shown in Fig. 6, at which time neither of the friction-wheels 18 or 19 is in contact with the friction-wheel 8 on the drive-shaft. When, however, the hand-lever 16 is moved slightly downward, the friction-wheel 18 is slightly elevated and put into contact with the said friction-wheel 8, whereupon the drive-gear 11 will be moved in one direction, the motion being communicated from friction-wheel 18 and through the train of gears 20 and 22. When, however, the hand-lever 16 is slightly raised, the friction-wheel 19 is put into contact with the continually-revolving friction-wheel 8, so that the pinion 21 will be caused to drive the gear 11 in a direction opposite to that caused by the frictional engagement of the friction-wheel 18.

Figure 2:
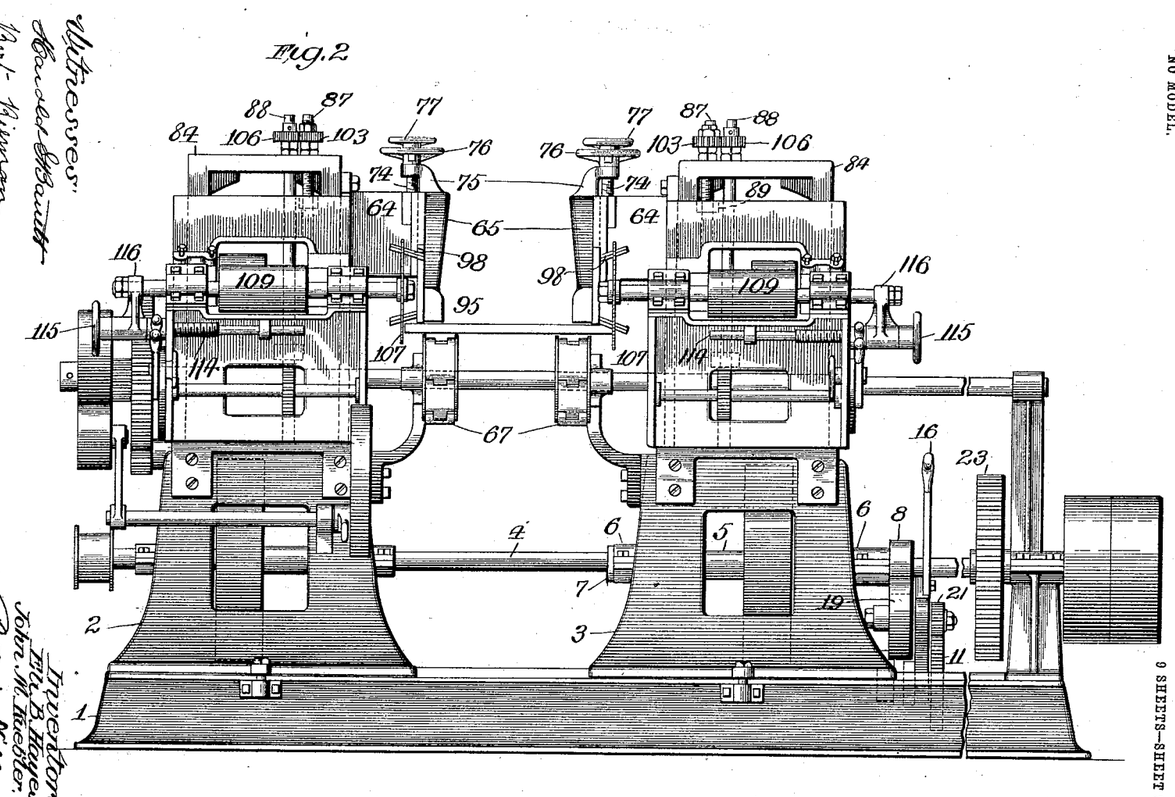
Fig. 2 is a front elevation of said machine.

Near the right-hand end, Figs. 1 and 2, of the main drive-shaft 4 is a gear 23, adapted to drive another gear 24, secured to the longitudinal counter-shaft 25, for operating the cope-arbors and slotting-saws, as hereinafter made apparent. These gears are preferably of the rawhide and steel type for the purpose of eliminating noise as much as possible. The operating connections and construction generally between this counter-shaft and the driven parts on both pedestals are exactly the same, and consequently a description of the parts associated with one pedestal will apply to both and the same reference characters would be used to indicate corresponding parts on both pedestals. In the following description, however, specific reference will be had to the parts on the movable or adjustable pedestal 3.

Upon the counter-shaft 25 is mounted a spur-wheel 26, meshing with a bevel-pinion 27, secured to the lower end of the cope-arbor 28, which has at its upper end the slotting-saws 29 and the cope-cutters 30, secured to the cutter-heads 31.

Figure 3:
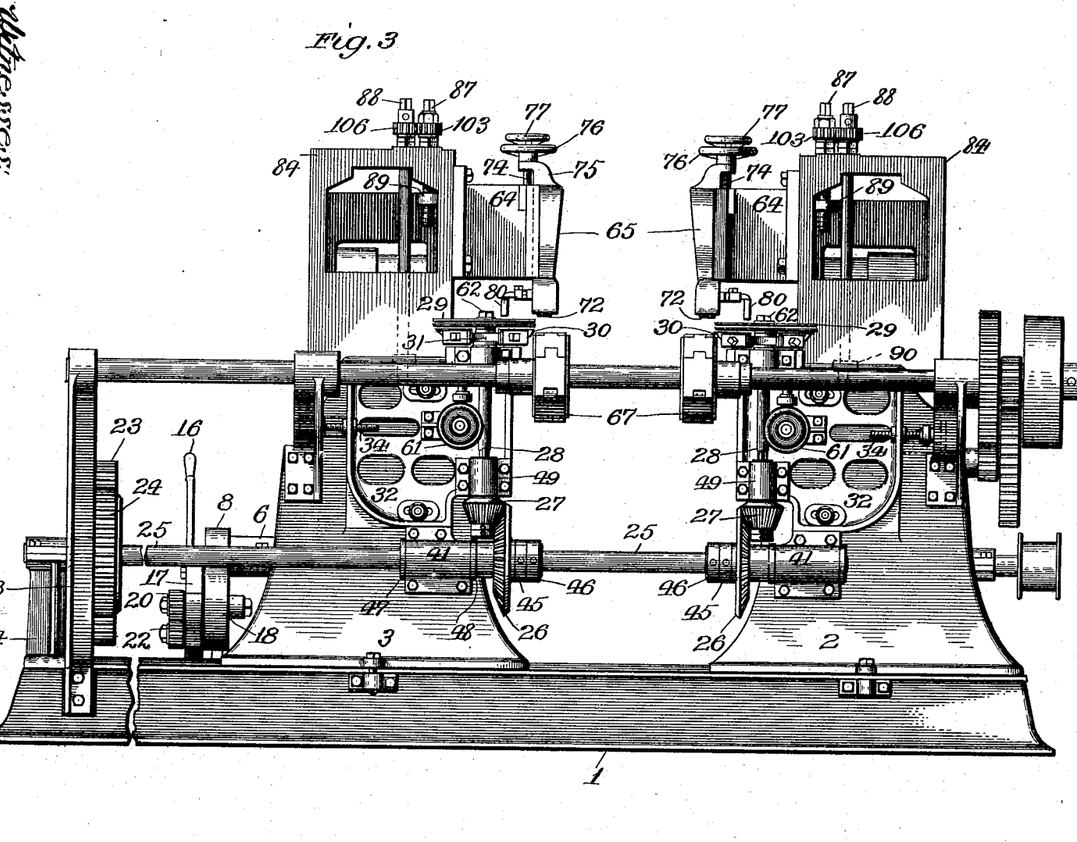
Fig. 3, a rear elevation of said machine.
Figures 8, 9, 10:
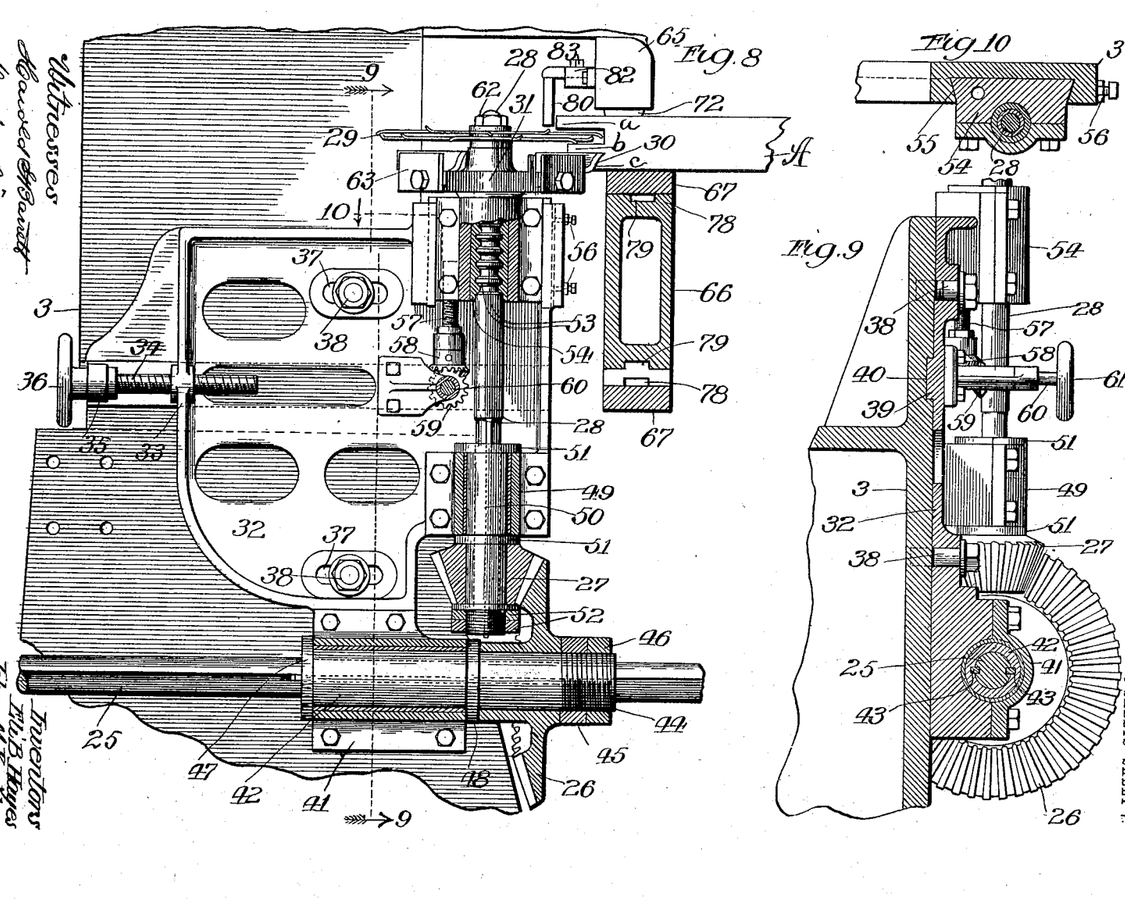
Fig. 8, an enlarged sectional elevation on the line 8 of Fig. 6.
Fig. 9, a section on the line 9 of Fig. 8.
Fig. 10, a section on the line 10 of Fig. 8.

To provide for the adjustment of the pedestal 3 along the counter-shaft 25 and make suitable provision for such shaft to prevent disengagement of the gears which it drives, we employ the following construction, reference being had more particular to Figs. 8, 9, and 10: A detachable plate 32 is arranged at one side of the pedestal and provided with a flange 33, having a screw-threaded hole to receive a screw 34, turning freely in the lug or support 35 on the pedestal and adapted to be turned by a hand-wheel 36, with the result that such plate can be adjusted to the right or left with respect to the pedestal, carrying with it the slotting-saws and cope-cutters, which are journaled or mounted therein. To hold the plate in adjusted position, it is provided with the horizontal slots 37, Figs. 3 and 8, through which pass the screw-bolts 38, entering the body of the pedestal. As illustrated in Fig. 9, the back of the plate is provided with a guide or rib 39, adapted to enter a horizontal channel or groove 40 in the side of the pedestal, whereby such plate or frame 32 will be caused to move with great accuracy in horizontal position on the pedestal.

The lower end of the adjustable plate or frame 32 forms or carries one half of the journal-box for the counter-shaft, the other half or cap 41 being secured thereto in suitable manner. Within this journal-box is arranged a sleeve 42, connected to the shaft preferably by the two feathers or keys 43 and extending beyond such bearing and through the spur-gear 26, as will be clearly understood from an examination of Fig. 8. The extreme end of this sleeve beyond the spur-gear has external screw-threads 44, receiving the nut 45, which bears against such spur-gear and is locked by the jam-nut 46. The sleeve has a fixed end collar 47 against the left-hand end, Fig. 8, of the journal-box and a second fixed collar 48 between the other end of such box and the hub of the spur-gear and against which such gear is clamped. This construction provides a suitable and efficient bearing for this rapidly-rotating counter-shaft, which in practice rotates about one thousand times per minute, and permits of the proper adjustment of the movable pedestal while the machine is in operation. Whenever this pedestal is moved in the manner hereinbefore described such pedestal, as well as the journal-bearing 41, its sleeve, and the spur-gear, move bodily along the counter-shaft, the gears always remaining in contact at the pitch-line. In like manner when the frame 32 is adjusted by the hand-wheel to vary the depth of cut of the slotting-saws, as hereinafter explained, the same parts are shifted or adjusted with respect to the pedestal and such counter-shaft.

The cope-arbor 28 is driven by the counter-shaft through the bevel-gears 26 and 27, and an extremely high rate of rotation is imparted to the arbor, in practice such arbor rotating about two thousand six hundred times per minute. The arbor has a journal box or bearing similar to that for the counter-shaft, as just described, except that the arbor is here designed to be moved with respect to its bearing instead of vice versa. To this end the adjustable frame 32 carries a box or journal 49, within which is a sleeve 50, splined on the arbor. The sleeve is splined on the arbor, having two keyways adapted to receive two keys let into the shaft, so that such sleeve may be driven by the cope-arbor, which is capable of vertical movement with respect to such sleeve. The sleeve 50 is provided with the fixed collars or flanges 51 and also has an extension through the bevel-pinion 27, which extension is provided with the nuts 52, similar to the nuts 45 and 46 upon the sleeve 42. As shown in Fig. 8, the cope-arbor is turned down at intervals at its upper end to form a series of rings 53, which are babbitted into a block 54 and adapted to rotate therein, but to be raised or lowered thereby when such block is itself raised or lowered. This block is arranged to slide in the dovetails 55, Fig. 10, in the pedestal and held thereto in adjusted positions by the set-screws 56. To raise the block and with it the arbor, the vertical screw 57 is used, Fig. 8, this screw working in a screw-threaded hole in the block and having at its lower end the bevel-gear 58, meshing with a similar gear 59 on a shaft 60, rotated by a hand-wheel 61. (See Fig. 3.) By turning this wheel in one direction or the other the block 54 is caused to be raised or lowered, carrying with it the slotting-saw and the cope-cutters, so that the latter are consequently adjusted with respect to the work or stock being operated upon. Also by adjusting the entire plate or frame 32 laterally, as hereinbefore described, the depth of cut of the saw and cutters is determined. As shown, the slotting-saw is secured at the top end of its arbor, being held thereto by the nut 62, while the series of cope-cutters is held to the cutter-head 31 by clamping-plates 63, bolted thereto.

The holddown device for the ends of the stock comprises a series of sectional pressure bars or blocks, constructed in the present instance as follows, reference being had to Figs. 3, 11, 12, and 13: A bracket 64 is in the present instance bolted to the pedestal, and its forward end is dovetailed into a frame or casing 65, whereby the latter may be raised or lowered with respect to the bracket. The horizontal lower end of the frame is arranged in proximity to and in the same vertical plane as the chain-beam 66 and the chain 67, which feeds the stock horizontally through the machine in order that it may be operated upon by the various tools of such machine. The lower end of such frame is curved outward and provided on one side with a detachable similarly outwardly curved longitudinal plate 68, whereby there is formed in such frame a longitudinal cavity 69, curved at its top, open at its bottom, and having the two opposite longitudinal shoulders 70 within such cavity. On these shoulders rest the flanges 71 of a series of similar pressure-blocks 72, whose body portion extends downwardly through the longitudinal opening in the bottom of the pressure-frame, being yieldingly projected therethrough by a resilient body arranged above the blocks, such as the rubber piece or pipe 73. The edges of the blocks are preferably rounded to prevent their catching upon the stock. To raise or lower the pressure-frame to accommodate different thicknesses of stock, a screw 74 is anchored in the bracket 64 and engages a projecting bracket 75 on the pressure-frame, a hand-wheel 76 being used to rotate the screw and a second hand-wheel 77 to lock it in adjusted position. Stock of any thickness can thus while passing through the machine be held with a yielding pressure by the series of pressure-blocks acting individually and also conjointly. Any unevenness or differences in thickness of the stock can thus be accommodated and yet the stock be held firmly against vertical movement.

Figures 11, 12, 13:
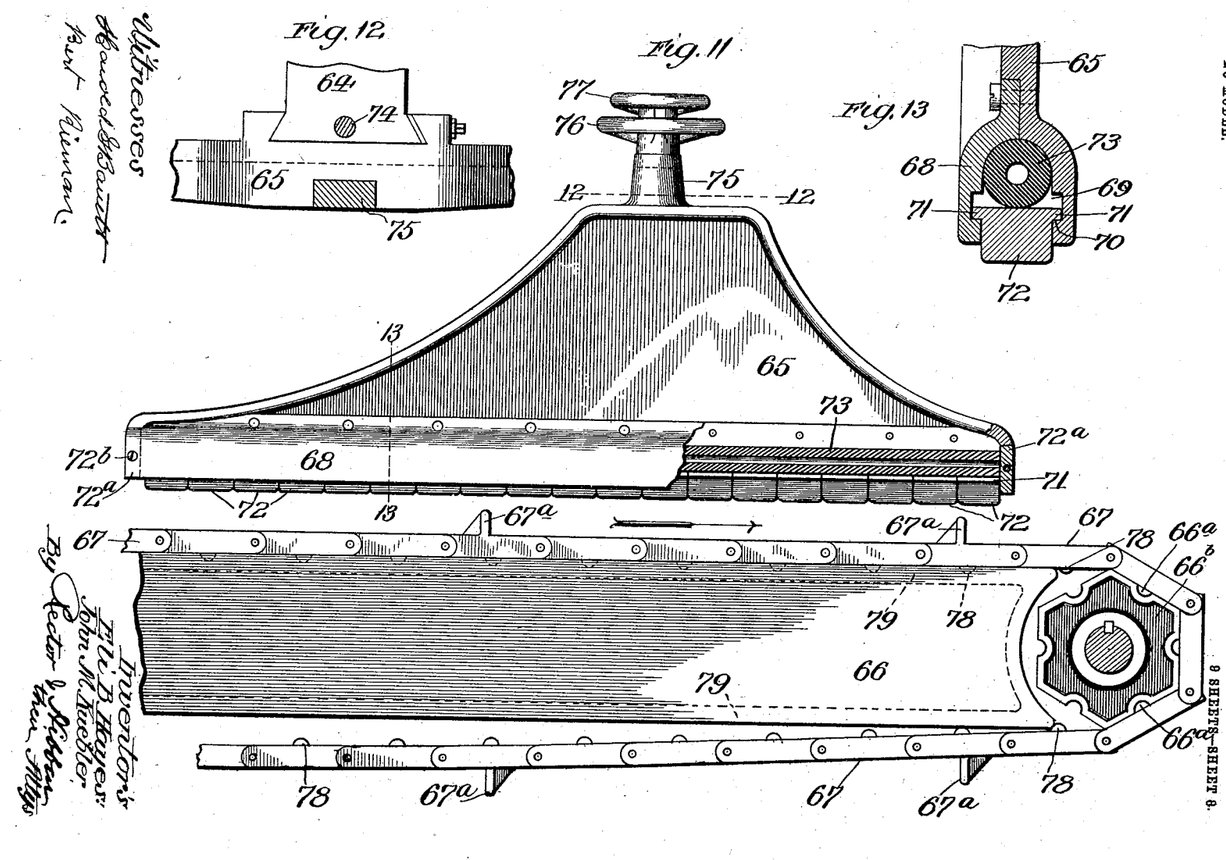

Referring to Figs. 11, 12, and 13, it will be observed that the plate 68 of the pressure device is removable, which will permit of the insertion of the rubber tube or pipe 73, while one or both of the ends of the cavity or channel formed in the lower end of the pressure device is closed by means of a plate or cap 72$^a$, which may be held by the screw 72$^b$. By removing one of these caps the pressure-blocks may be inserted, or any one or more of them may be removed for any purpose desired.

In the present instance our chain is composed of solid links, each having a projecting tooth or lug 78, which runs or fits snugly but operatively in a groove or channel 79 in the chain-beam. In actual practice this tooth is only one-third of the width of the link and of the chain-beam, so that the flat surface on each side of the tooth bears or slides upon the surface of the beam, the tooth preventing any movement of the chains out of a plane parallel with the beam. These teeth on the chain also engage the recesses 66$^a$ in the hexagonal drive-wheel 66$^b$ of the chain, the construction being such that three sides of the hexagon are always engaged, whereby all twisting or lack of uniformity in the drives of the chain are absolutely prevented. This particular means provides a most efficient construction for the purpose intended.

It is necessary or desirable to provide means for preventing endwise movement of the stock while being acted upon, especially in double-end tenoning-machines. In practice it is found that there is liability of the stock slipping endwise while the cutters are cutting, which movement of course must be prevented, lest the resulting work be poor or inaccurate. To prevent such endwise movement, we have provided in the present instance and adjustable gage 80, (see Figs. 3, 6, 7, 7$^a$, and 8,) having an arm 81, which is received by a socket or bracket 82 on the holddown-frame 65 and held in adjusted position by a set-screw 83 or otherwise. This gage is arranged immediately above the saw and forms an abutment for the end of the stock which is being cut—in the present instance a check-rail sash. After the set-screws 83 are loosened the gage can be adjusted in or out to accommodate different lengths of stock. It is to be understood that the stationary pedestal carries a similar slotting-saw and pressure device as well as a similar gage, so that there will be a gage at each end of the stock corresponding in distance apart exactly with the length of the stock or check-rail.

Each pedestal has an upper frame 84, two of whose corners are dovetailed into two sliding frames 85 and 86, Figs. 1 and 4. These latter frames consequently have sliding relation to the stationary frame 84 and are capable of movement or adjustment up and down thereon by means of the two screws 87 and 88, the former engaging the lug 89 on the sliding frame 85 and the latter the lug 90 on the frame 86. Each sliding frame has journal-bearings for the horizontal shafts 91 and 92, respectively, provided with the driving-pulleys 93 and 94. (See Fig. 4.) Each of the shafts 91 and 92 carry similar tenon-cutters, and a description of the cutters of one set will suffice for both. Secured on its inner end adjacent to the stock the shaft 92, for instance, has a circular plate or disk 95, having a hub 96 and radial extensions or knife-supports 97. There are two of these tenon cutters or knives 98, which are adjustably secured to the outer ends of the knife-supports by bolts 99. The lower shaft 92, however, has in addition to the tenon-knives a set of saw-sections or spurs 100, fastened to the ends of a frame 101, which is adjustably secured to the shaft 92 by means of the set-screw 102, Fig. 6ª. These knives and saws are adapted to work on the stock before it reaches the slotting-saws and copes when the peculiar check-rail herein shown is the work which is to be done. The purpose of the cutters 98 is of course to cut the tenon, while the purpose of the saws is to cut a kerf near the end of the rail, Fig. 6ᵇ, so that when the slotting-saw has done its work and sawed across such kerf the tenon will be shorter than the lip of the check-rail, or, in other words, considering such lip a tenon, the purpose is to cut one tenon shorter than the other, such work being done while the stock is passing through the machine. The reason for cutting off this tenon arises from the fact that there is a groove in the sash-stile one-half inch deep on that end of the stile where the check-rail goes in, and so by cutting it off one-half inch shorter than the lip above such tenon passes through the stile to the bottom of the groove, and consequently no further work is required of it. The frame or heads for the saw-sections are capable of being adjusted in or out to cut off such tenon more or less, and, moreover, such saw-sections may be, in fact, moved so far back as to be inoperative when construction of check-rail is not desired, and likewise the tenon cutters or knives can be so moved as to cut different lengths of tenons.

In the present instance the sliding frames for the tenon-cutters and the adjusting-screws of such frames are so arranged as to cause such frames to be moved up or down together or either one thereof to be moved independently of the other. As shown in Figs. 4 and 5, the screw 87, whose upper end is square or angular to take a key-wrench, has a pinion 103 clamped thereto by the nut 104, which screws upon the split hub or neck 105 of such pinion, Fig. 4ª. This pinion meshes with a pinion 106, which, as shown, is secured to the screw 88, whereby the rotation of the screw 87 is transmitted to the other screw, 88, whenever the nut 104 is screwed down tight enough to clamp the pinion 103. It is apparent that when the upper frame 85 is raised by the turning of the screw 87 the other frame, 86, is simultaneously lowered, because the pinion 106 of the screw 88 will be turned in a direction opposite that of the pinion 103. In case, however, it is desired or required to raise or lower the upper frame independently of the lower frame the nut 104 is loosened, whereupon the screw 87 can be turned by a wrench without turning the other screw, the gears 103 and 106 remaining stationary and the upper frame consequently moving up or down independently. Likewise while this nut remains loosened the other screw, 88, may be rotated to independently move the lower sliding frame 86. Each pedestal is also provided with a circular saw 107, adapted to trim the ends of the stock. Each saw is mounted on a shaft or arbor 108, having a pulley 109 and arranged in suitable bearings on a vertically-adjustable bearing-frame 110. This frame has a pinion 111, engaging a rack 112 on the pedestal and turned by a lever 113, Figs. 5 and 6. The saw-arbor is adjusted laterally by means of the screw 114, operated by the hand-wheel 115 and having the operating connection 116. (See Fig. 2.)

Referring to Fig. 1 and assuming that it is desired to make the form of check-rail shown in Fig. 1ª of the drawings, for which work the machine is shown adjusted, the stock is laid on the chain conveyer at the front of the machine and in front of the lugs 67ª, Fig. 11, and is carried rearwardly therethrough. The saws 107 are first encountered, and the ends of the rail are thereby properly trimmed or squared. Next the tenon-cutters and the saws for cutting off the end of the tenon operate on the rail to form the tenon and cut it off the required length. The rail is now carried to the slotting-saws and copes, and the slot and cope are formed in both ends of the rail. It is understood that the pressure device at all times, while the above-described work is being done, is performing its function of holding down the stock with yielding pressure. Of course when the particular kind of work is being done as herein illustrated—that is, the making of a check-rail—the upper tenon-cutters are moved upward, so as to be inoperative, and only the lower cutters are here required. It will be understood that when an ordinary tenon is to be made both tenon-cutters are called into operation and the saw-sections are adjusted to inoperative position.

The belting and gears for driving the various shafts, cutters, and saws are so plainly shown in the drawings as to require no description.

Figure 14:
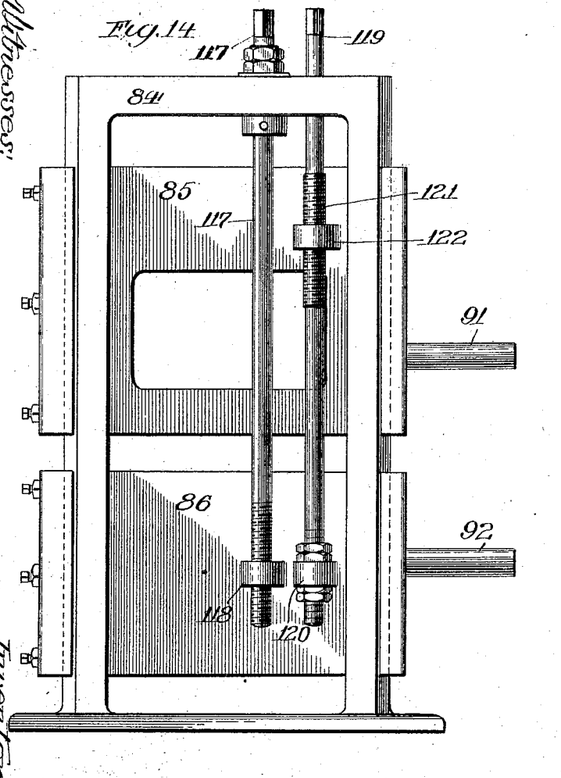
Figure 15:
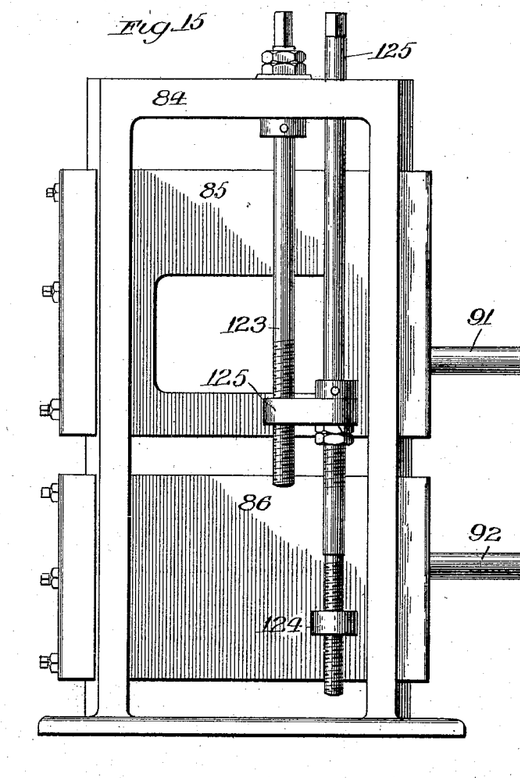

In Figs. 14 and 15 are shown modified means for adjusting the sliding frames carrying the arbor of the tenon-cutters. Referring to Fig. 14, the frames 85 and 86 slide on the stationary frame 84, and the screw 117 rotates freely in the frame 84, but has screw engagement with the lug 118 on the lower frame 86. The other screw, 119, also rotates freely in the frame 84, is secured to a second lug 120 on the frame 86, and is provided with a screw-threaded portion 121, engaging a lug 122 on the upper frame 85. When the screw 117 is rotated, both sliding frames will be raised or lowered together, depending on the direction of rotation, the upper frame 85 being carried bodily up or down by reason of its connection with frame 86 through screw 119; but in case screw 119 is the one rotated the frame 86 will remain stationary and the upper frame will be independently raised or lowered by reason of the screw connection between the screw 121 and the lug 122.

Referring now to Fig. 15, the screw 123 passes freely through the frame 84 and engages the lug 124 on frame 85. The other screw, 125, passes freely through the frame 84 and the lug 124 and engages lug 126 on the lower frame 86. When screw 123 is rotated, both frames will be adjusted up or down together, and when screw 125 is turned the lower frame will be independently adjusted up or down.

The product of our machine when adjusted as hereinbefore described is a check-rail sash, one end of which is illustrated in Fig. 1ª, where the sash or stock is represented by A, the outer tenon by $a$, the shorter or cut-off tenon by $b$, and the cope by $c$. Referring to Fig. 6ᵇ, the piece $a'$ left after the saws 100 have done their work is cut off by the slotting-saws 29 as they cut the slot between the tenons $a$ and $b$.

We claim—

1. A tenoning-machine comprising a machine-frame having suitable tenon-cutters and a holddown or pressure device therefor for pressing on the stock to be operated upon by such cutters and extending in the direction of the line of feed and substantially in the plane of rotation of the cutters, said device consisting of a frame provided with a longitudinal cavity having a continuous opening on its lower side and arranged above the stock, a series of blocks projecting through said opening and arranged in contiguous relation with each other, and means common to all the blocks for yieldingly holding them in projected condition; substantially as described.

2. A tenoning-machine comprising a machine-frame having suitable tenon-cutters and a holddown or pressure device therefor for pressing on the stock to be operated upon by said cutters and extending in the direction of the line of feed and substantially in the plane of rotation of the cutters, said device consisting of a frame provided at its lower end with a cavity having a longitudinal continuous opening immediately above the stock, a series of blocks projecting through said openings and in contiguous relation to each other, and a single piece of rubber arranged in said cavity above the blocks and common to all of them; substantially as described.

3. A tenoning-machine comprising a machine-frame having suitable tenon-cutters and a holddown or pressure device therefor for pressing on the stock to be operated upon by said cutters and extending in the direction of the line of feed and substantially in a plane of rotation of the cutters said device consisting of a frame provided at its lower end with a cavity having a longitudinal opening above the stock, a series of blocks projecting through said opening and a rubber pipe arranged in said cavity above the blocks; substantially as described.

4. A tenoning-machine comprising a machine-frame having suitable tenon-cutters and a holddown device therefor for pressing on the stock to be operated upon by such cutters and extending in the direction of the line of feed and substantially in the plane of rotation of the cutters, said device consisting of a frame provided at its lower end with a cavity having a longitudinal opening above the stock, a series of blocks projecting through said opening, means for retaining the blocks within the cavity and a rubber strip arranged in said cavity above the blocks.

5. A tenoning-machine comprising a machine-frame having suitable tenon-cutters and a holddown device therefor for pressing on the stock to be operated upon by such cutters and extending in the direction of the line of feed and substantially in the plane of rotation of the cutters, said device consisting of a frame provided at its lower end with a cavity having a longitudinal opening above the stock, a series of blocks projecting through said opening, means for retaining the blocks within the cavity and a rubber pipe arranged in said cavity above the blocks.

6. A tenoning-machine comprising a machine-frame having suitable tenon-cutters and a holddown or pressure device therefor for pressing on the stock to be operated upon by such cutters and extending in the direction of the line of feed and substantially in the plane of rotation of the cutters, said device consisting of a frame provided at its lower end with a cavity having a longitudinal opening above the stock, a series of blocks projecting through said opening, said cavity having internal shoulders, the blocks having flanges to rest on the shoulders when the blocks are projected to full extent, and means for yieldingly holding the blocks projected; substantially as described.

7. A tenoning-machine comprising a machine-frame having suitable tenon-cutters and a holddown or pressure device therefor for pressing on the stock to be operated upon by such cutters and extending in the direction of the line of feed and substantially in the plane of rotation of the cutters, a frame provided at its lower end with a cavity having a longitudinal opening above the stock, a series of blocks projecting through said opening, said cavity having a rounded top and internal shoulders on each side of said opening, and the blocks having flanges to rest on such shoulders, and a rubber pipe adapted to be received by said cavity fitting its upper portion snugly and adapted to press on the inner or top ends of said blocks; substantially as described.

8. A tenoning-machine comprising a machine-frame having suitable tenon-cutters and a holddown or pressure device therefor for pressing on the stock to be operated upon by such cutters and extending in the direction of the line of feed and substantially in the plane of rotation of the cutters, a frame or support having a cavity at its lower end with a longitudinal opening above the stock, a curved removable plate 68 forming one side of the cavity, a series of blocks having means for retaining them in such cavity, but adapted to have their lower portions projected through said opening, and means for yieldingly holding the blocks projected comprising a rubber pipe fitting within said cavity and common to all the blocks; substantially as described.

9. A tenoning-machine comprising a machine-frame having suitable tenon-cutters and a holddown or pressure device therefor for pressing on the stock to be operated upon by such cutters and extending in the direction of the line of feed and substantially in the plane of rotation of the cutters, a frame or support having a cavity at its lower side with a longitudinal opening above the stock and open at an end, a removable plate or closure for such open end, a series of blocks retained in such cavity and insertible through said end but adapted to have their lower portions projected through said longitudinal opening, and means for yieldingly holding the blocks projected; substantially as described.

10. A tenoning-machine comprising a machine-frame having suitable tenon-cutters and a holddown or pressure device therefor for pressing on the stock to be operated upon by said cutters and extending in the direction of the line of feed and substantially in the plane of rotation of the cutters, a frame 65 having its lower portion outwardly curved, a removable plate 68 secured to said frame 65 and oppositely curved, whereby a cavity 69 is formed, a resilient pipe 73 in the cavity, a series of blocks 72, each having opposite flanges 71 and contacted by the pipe, said cavity having shoulders 70 on which said flanges rest when the blocks are projected to full extent; substantially as described.

11. In a tenoning-machine, the combination of the machine-frame, an endless conveyer therein for carrying the stock through the machine, a tenoning-tool arranged on the machine, and a gage arranged at one side of the conveyer and above the plane thereof for preventing endwise movement of the stock with respect to the conveyer and comprising a depending plate secured to the machine-frame and arranged for vertical adjustment and also lateral adjustment, toward and away from said conveyer; substantially as described.

12. In a tenoning-machine, the combination of the machine-frame having a tenoning-tool, a conveyer in said frame for conveying the stock through the machine and into coöperative association with said tool, a gage for preventing endwise movement of the stock with respect to the conveyer when such stock is being operated upon by said tool, said gage being arranged at one side of said carrier and above and adjacent said tool and adapted to bear against the ends of the stock, and means for adjusting the gage toward and away from the conveyer to accommodate different lengths of stock; substantially as described.

13. In a tenoning-machine, the combination of the machine-frame having an operating-tool, a conveyer arranged in said frame for conveying the stock through the machine and into coöperative association with said tool, a vertically-adjustable presser device arranged above said conveyer and adapted to hold down the stock upon the conveyer, and a gage arranged on said presser device to abut an end of the stock to prevent endwise movement thereof with respect to the conveyer; substantially as described.

14. In a tenoning-machine, the combination of the machine-frame having an operating-tool, a conveyer arranged in said frame for conveying the stock through the machine and into coöperative association with said tool, a presser device arranged above said conveyer to hold down the stock upon the conveyer and adjustable up and down to accommodate different thicknesses of stock, and a gage arranged adjacent the tool at one side of the conveyer and adapted to be abutted by an end of the stock while being operated upon by the tool, said gage being adjustably mounted upon said presser device and also being adjustable therewith; substantially as described.

15. In a tenoning-machine, the combination of the machine-frame, a beam therein, an endless conveyer coöperating with said beam and adapted to carry the stock through the machine, a presser device arranged on the frame and above in alinement with the beam, a working tool mounted in the machine laterally of the beam, and a gage mounted on the outer side of the presser device, also laterally of the beam and above said tool and adapted to engage an end of the stock to prevent endwise movement thereof while being operated upon by the tool; substantially as described.

16. A tenoning-machine comprising a machine-frame, a conveyer therein for feeding the stock broad side and transversely of the machine, and means in said machine for operating on such stock to make check-rail sash comprising a saw and cutter arranged at one side of the stock for cutting a tenon, the saw being arranged adjacent the outer end of the tenon and being of such diameter as to cut only a kerf in the stock and a slotting-saw subsequently encountered by the stock when fed through the machine and arranged to intersect said kerf; substantially as described.

17. A tenoning-machine comprising a machine-frame, a conveyer therein for feeding the stock broad side and transversely of the machine, and means in said machine for operating on such stock to make check-rail sash comprising a combined saw and cutter arranged at one side of the stock, the saw being arranged adjacent the outer end of the tenon and being of such diameter as to cut only a kerf in the stock and a slotting-saw and cope-cutter subsequently encountered by the stock when fed through the machine, said slotting-saw being arranged to intersect said kerf; substantially as described.

18. A tenoning-machine comprising a machine-frame, a conveyer therein for feeding the stock broad side and transversely of the machine, and means in said machine for operating on such stock to make check-rail sash, a trimming-saw first encountered by the stock, then a combined saw and cutter arranged at one side of the stock for cutting a tenon, the saw being arranged adjacent the outer end of the tenon and being of such diameter as to cut only a kerf in the stock and a slotting-saw subsequently encountered by the stock when fed through the machine and arranged to intersect said kerf; substantially as described.

19. In a tenoning-machine, the combination of the pedestals, frames adjustable thereon and carrying the working parts and tools of the machine, a driving-shaft having bearings on the frames, each of the bearings comprising a box on its frame, a sleeve arranged within the box and around the shaft and having an extension, a driving member secured to said extension of the sleeve, and operating connections between the driving member and the tools; substantially as described.

20. In a tenoning-machine, the combination of the pedestals, frames adjustable thereon and carrying the working parts or tools of the machine, a driving-shaft having bearings on the frames, each bearing comprising a box on its frames, a sleeve arranged within the box and splined on the shaft, said sleeve having an extension, and a gear secured to such sleeve extension, and operating connections between the gear and the tools; substantially as described.

21. In a tenoning-machine, the combination of the pedestals, frames adjustable thereon and carrying the working parts or tools of the machine, a driving-shaft having bearings on the frames, each bearing comprising the box on its frame, a sleeve arranged within the box and splined on the shaft, said sleeve having an extension screw-threaded at its end, a gear arranged on the sleeve extension and a nut screwing onto the sleeve extension for fastening the gear thereto, and positive drive operating connections between the gear and the tools; substantially as described.

22. In a tenoning-machine, the combination with the pedestals, frames adjustable thereon and carrying the working parts or tools of the machine, a driving-shaft having bearings on the frames, each bearing comprising the box on its frame, a sleeve arranged within the box and splined on the shaft, said sleeve having an extension, and having flanges or collars 47 and 48 at the ends of the box, said extension being screw-threaded, and a gear arranged on the sleeve extension, the nuts 45 and 46 screwing onto the sleeve extension to secure the gear thereto, and positive drive operative connections between the gear and the tools; substantially as described.

23. In a tenoning-machine, a machine-frame having a movable pedestal, an adjustable arbor for a cutting-tool, in connection with a bearing comprising a box or journal movable with the pedestal and also independently thereof, a sleeve within the box and around the arbor, said arbor having a keyway, and said sleeve having a key received thereby in combination with means for driving said sleeve; substantially as described.

24. In a tenoning-machine, a machine-frame having a movable pedestal, an adjustable arbor for a cutting-tool in connection with a bearing comprising a box or journal movable with the pedestal and also independently thereof, a sleeve within the box and around the arbor, said arbor having a keyway, and said sleeve having a key received thereby, said sleeve having an extension, a gear secured to said extension, and means for moving the arbor longitudinally; substantially as described.

25. In a tenoning-machine, a machine-frame having a movable pedestal, an adjustable arbor for a cutting-tool, in connection with a bearing comprising a box or journal movable with the pedestal and also independently thereof, a sleeve within the box and around the arbor, said arbor having a keyway, and said sleeve having a key received thereby, said sleeve having an extension, and the two collars 51 at the ends of the box, a gear secured to said extension, means for moving the arbor longitudinally, and means for driving said gear; substantially as described.

26. In a tenoning-machine, the combination of an adjustable pedestal for the working parts, a drive-shaft, a frame having bearings for said shaft and the tools and carrying the latter, and means for adjusting the frame on the pedestal; substantially as described.

27. In a tenoning-machine, the combination of an adjustable pedestal for the working parts, a frame adapted to slide horizontally on the pedestal and having bearings for the working tools and also having bearings for the drive-shaft for such tools and a drive-shaft on which the frame is adjustable longitudinally as well as horizontally with respect to the pedestal; substantially as described.

28. In a machine of the class described, the combination, with a suitable support, of frames adapted to carry the operating-tool and arranged to slide with respect to said support, and means for simultaneously adjusting said frames up or down or independently of each other, comprising two separate and parallel-arranged screws for the respective frames and constantly-meshing pinions on said screws respectively, the pinion of one screw being fixed and the other capable of turning loosely on its screw, and means for clamping said loose pinion to its screw in exactly whatever desired position of rotary adjustment it may be; substantially as described.

29. In a machine of the class described, the combination, with a suitable support, of frames adapted to carry the operating-tool and arranged to slide with respect to said support, and means for simultaneously adjusting said frames up or down or independently of each other, comprising two screws for the frames respectively, a pinion having a split hub or neck arranged on one of said screws, a nut fitting said neck to clamp the pinion to its screw when desired, whereby such pinion may be clamped to its screw in exactly whatever desired position of rotary adjustment it may be, and a second pinion fixed on the other screw, said pinions being in constant mesh, and so arranged, as described, that the movement of the fixed pinion moves its screw only when the other pinion is loose on its screw but moves both pinions when such other pinion is clamped to its screw; substantially as described.

30. In a tenoning-machine, the combination of a frame or support 84, upper and lower frames for the working tools and arranged to slide on said support, lugs 89 and 90 on said upper and lower frames respectively, a screw 87 passing through said support and engaging the lug 89, a second screw 88 also passing through said support and engaging the lug 90, pinions 103 and 106 on the screws 87 and 88 respectively and meshing with each other, the pinion 106 being fixed on its screw and the pinion 103 having a split hub 105, and a nut 104 screwing upon said hub whereby the pinion 103 may be tightly clamped to its screw in exactly whatever desired position of rotary adjustment it may be, substantially as described.

31. In a tenoning-machine, the combination of a fixed and an adjustable pedestal or support, a conveyer on each pedestal for carrying the stock through the machine, slotting-saws on the respective pedestals, a gage arranged on each pedestal and above the slotting-saw to engage opposite ends of the stock, and means for adjusting the gages laterally toward and away from each other to accommodate different lengths of stock; substantially as described.

32. In a tenoning-machine, the combination of a base, a fixed and an adjustable pedestal or support thereon, a conveyer on each pedestal for carrying the stock through the machine, a presser device arranged on each pedestal and above the conveyer, and a gage adjustably supported on each presser device and arranged at the outer side of each conveyer to engage opposite ends of the stock; substantially as described.

33. In a tenoning-machine, the combination of the machine-frame having a tenoning-tool, a presser device arranged on said frame and comprising a series of yieldingly-pressed blocks adapted to press upon the stock as it passes through the machine and a gage mounted on said presser device on the outer side thereof, and adjacent the tool to engage the end of the stock in the passage thereof through the machine.

34. In a tenoning-machine, the combination of the machine-frame, a presser device arranged on said frame and comprising a series of yieldingly-pressed blocks adapted to press upon the stock as it passes through the machine, a tenoning-tool mounted in said machine-frame, and a gage arranged on said presser device adjacent and extending toward the tenoning-tool to engage the end of the stock in the passage thereof through the machine.

35. In a tenoning-machine, the combination of the machine-frame, a beam therein, an endless conveyer coöperating with said beam, a presser device arranged on the frame and above in alinement with the beam, a tenoning-tool mounted in the frame and laterally of the beam, and a gage mounted on the presser device and above the tenoning-tool, such gage being adapted to engage the end of the stock and prevent endwise movement thereof when operated upon by such tool.

36. In a tenoning-machine, the combination of the machine-frame, a beam therein, an endless conveyer coöperating with said beam, a presser device arranged on the frame and above in alinement with the beam, means for vertically adjusting the presser device, a tenoning-tool mounted in the frame laterally of the beam, and a gage carried by the presser device and above the tenoning-tool and adapted to engage the end of the stock, said gage being adjustable laterally of the presser device to accommodate different lengths of stock and partaking of the vertical adjustment of such presser device.

37. In a tenoning-machine, the combination of the machine-frame, a presser device arranged on the machine-frame and having a series of yieldingly-pressed blocks adapted to press upon the stock, a tenoning-tool in the machine and an adjustable gage device comprising the gage proper, adapted to engage the end of the stock and having a slotted arm 81, a bracket 82 secured to the presser device and having a socket to receive the arm 81, and a bolt and nut for holding the arm and its gage in adjusted positions.

38. In a tenoning-machine, the combination of an adjustable pedestal or support, a drive-shaft having a drive-gear, a frame adjustable on said pedestal, a rotatable tool, a gear driven by said drive-gear for rotating said tool, said frame being arranged to be adjustable upon the pedestal and also longitudinally of the drive-shaft, and fixed bearings arranged on the adjustable frame for said gears.

39. In a tenoning-machine, the combination of an adjustable pedestal or support, a drive-shaft having a drive-gear provided with a feather-and-groove connection with the shaft, a frame adjustably connected with said pedestal, a rotatable tool having an arbor, a gear mounted on said arbor and driven by said drive-gear, and fixed bearings arranged on the adjustable frame for said arbor and said drive-gear.

40. In a tenoning-machine, the combination of a machine frame or support, a tenoning-tool having an arbor, a driven gear adapted to rotate said arbor, a driving-shaft having a gear in permanent mesh with said arbor-gear, a frame adjustable on the machine-frame and having bearings for said shaft and arbor-gear, and means for adjusting the arbor independently of said adjustable frame.

41. In a tenoning-machine, the combination of the machine-frame, a presser device arranged thereon and having a series of yieldingly-pressed blocks adapted to press upon the stock, an operating-tool in the machine, and an adjustable gage device comprising the gage proper adapted to engage an end of the stock, a bracket secured to the presser device and extending laterally thereof, said gage having an arm adjustably secured to said bracket; substantially as described.

42. In a tenoning-machine, the combination of the machine-frame, a presser device arranged thereon and having a series of yieldingly-pressed blocks adapted to press upon the stock, an operating-tool in the machine, an adjustable gage device comprising the gage proper adapted to engage an end of the stock, and having a slotted arm, a bracket secured to the presser device and extending laterally thereof, and a bolt and nut for holding the arm and its gage in adjusted positions; substantially as described.

43. In a tenoning-machine, the combination of an adjustable pedestal or support, a drive-shaft, and a frame adapted to be adjusted horizontally with respect to the pedestal and having bearings for the working tools and also for said drive-shaft for such tools; substantially as described.

44. In a tenoning-machine, the combination of an adjustable pedestal or support, a drive-shaft having a driving-gear, a working tool having an arbor provided with a gear meshing with the driving-gear, and a frame adjustable with respect to said pedestal and having bearings for said shaft and arbor; substantially as described.

45. In a tenoning-machine, the combination of an adjustable pedestal or support, a drive-shaft having a driving-gear, a working tool having an arbor provided with a driven gear meshing with the driving-gear, and means for adjusting said tool vertically and laterally without disturbing the mesh of said gears; substantially as described.

46. In a tenoning-machine, the combination of an adjustable pedestal or support having horizontal guides thereon, a drive-shaft, a horizontally-movable frame operating in said guides and having bearings for a working tool and for said drive-shaft, and driving connections between said shaft and tool; substantially as described.

47. In a tenoning-machine, the combination of a pedestal or support, a drive-shaft, a frame adjustable horizontally with respect to said pedestal and having bearings for a working tool and for said drive-shaft, driving connections between said shaft and tool, and a hand-wheel and screw coöperating with said frame whereby the latter may be moved or adjusted in a horizontal direction; substantially as described.

48. In a tenoning-machine, the combination of a base or bed plate, a pedestal or support slidable thereon, a frame or member carried by said pedestal and independently adjustable with respect thereto, a tool-driving shaft having bearings in said frame, a tool whose arbor has its bearings also in said frame and driving connections between said shaft and tool-arbor; substantially as described.

49. In a tenoning-machine, the combination of a base or bed plate, a fixed pedestal thereon, a movable pedestal slidable and adjustable on said base, similar frames adjustable with respect to the pedestals in a horizontal plane, the frame of the adjustable pedestal being adjustable with and also independently thereof, a tool-driving shaft having bearings in both of said frames, working tools whose arbors have their bearings in the frames respectively, and driving connections between said shaft and tool-arbors; substantially as described.

50. In a tenoning-machine, the combination of a pedestal or support, a drive-shaft, a working tool having an arbor, a frame adjustable with respect to the pedestal and in a horizontal plane and having two bearings arranged at right angles to each other for the drive-shaft and tool-arbor respectively, and meshing bevel-gears on the shaft and tool-arbor, whereby the tool is driven; substantially as described.

51. In a tenoning-machine, the combination of a pedestal or support, a drive-shaft, a tool and its arbor, a frame carried by said pedestal or support and having bearings for said shaft and arbor, positive drive connections between the shaft and arbor, and means for adjusting said tool both horizontally and vertically; substantially as described.

52. In a tenoning-machine, the combination of a pedestal or support, a drive-shaft, a tool and its arbor, a frame carried by said pedestal or support and having bearings for said shaft and arbor, positive drive connections between the shaft and arbor, an adjusting-screw engaging said frame to adjust it horizontally, and separate and independent means for vertically adjusting said arbor and its tool; substantially as described.

53. In a tenoning-machine, the combination of a base having a fixed pedestal and an adjustable pedestal, similar frames arranged on the respective pedestals and adjustable thereon, a driving-shaft having bearings in both of said frames, working tools whose arbors have their bearings in the frames respectively, and positive drive connections between said shaft and arbors, the frame of the adjustable pedestal being adjustable longitudinally of said driving-shaft; substantially as described.

ELI B. HAYES.
JOHN M. KUEBLER.

Witnesses to signature of Eli B. Hayes:
GEORGE HILTON,
BART HEIS.

Witnesses to signature of John M. Kuebler:
G. D. JONES,
ROBERT SCHMIDT.